Sept. 29, 1942.   R. E. COTTON ET AL   2,297,050
BLOWER STRUCTURE
Filed June 12, 1941   2 Sheets-Sheet 1
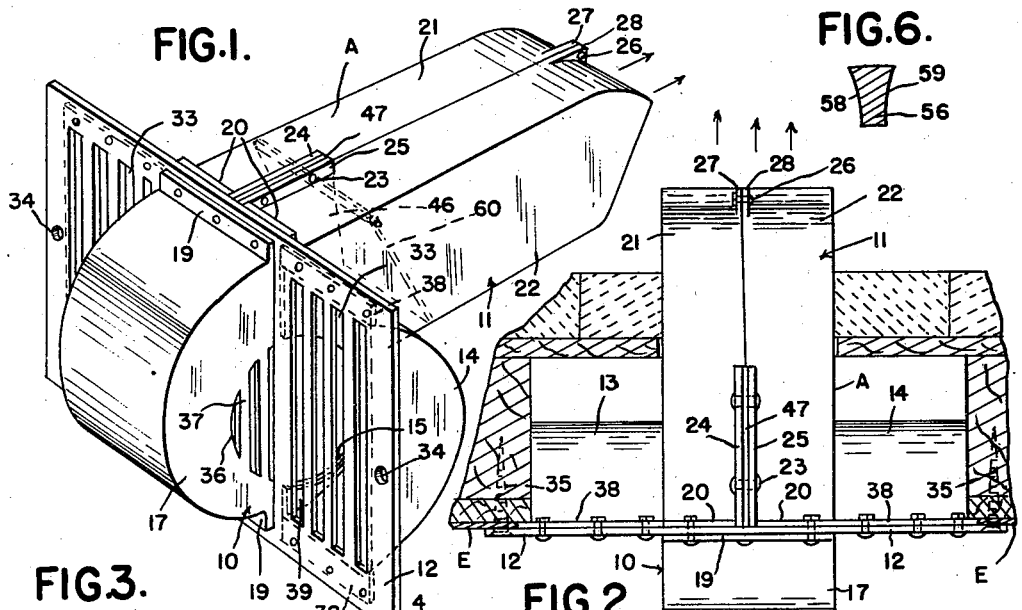
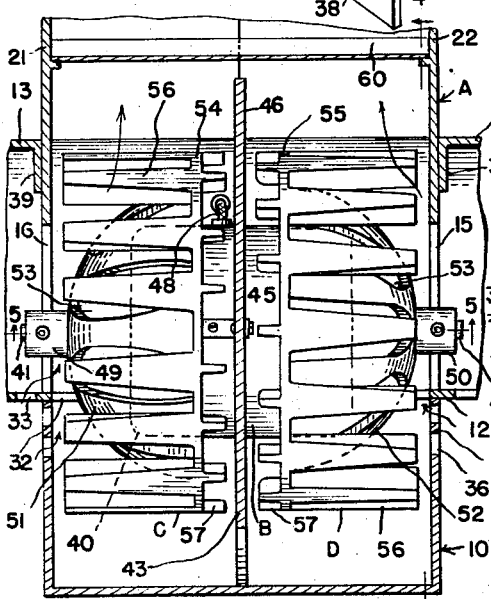
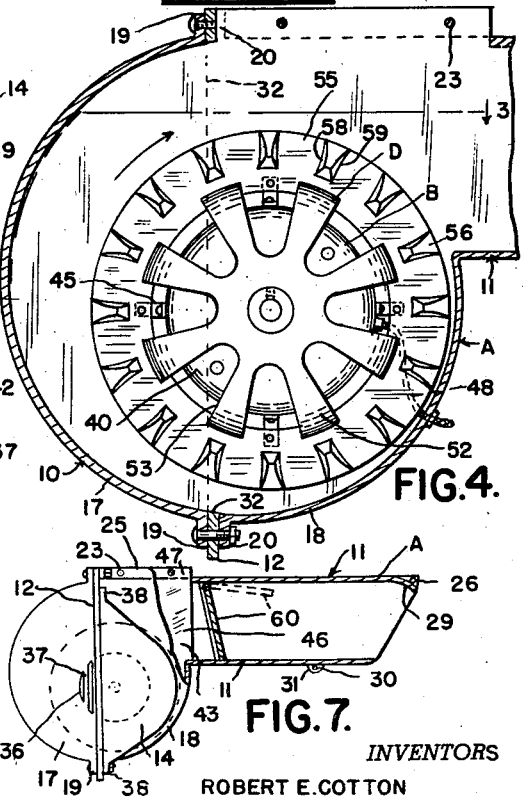
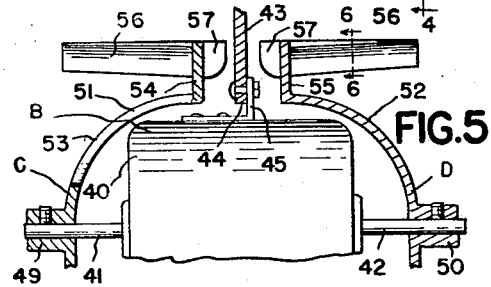
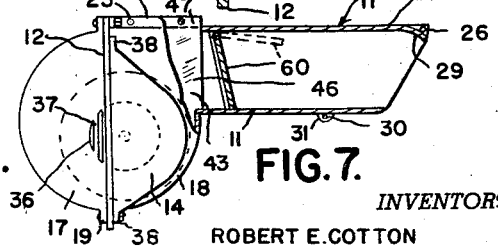
INVENTORS
ROBERT E. COTTON
MARIO C. TATA
BY
ATTORNEYS Sept. 29, 1942.   R. E. COTTON ET AL   2,297,050
BLOWER STRUCTURE
Filed June 12, 1941   2 Sheets-Sheet 2

INVENTORS
ROBERT E. COTTON
MARIO C. TATA
BY
ATTORNEYS

Patented Sept. 29, 1942

2,297,050

UNITED STATES PATENT OFFICE 2,297,050

BLOWER STRUCTURE

Robert E. Cotton, St. Clair Shores, and Mario C. Tata, Detroit, Mich.

Application June 12, 1941, Serial No. 397,779

9 Claims. (Cl. 230—117)

This invention relates generally to blower structures and refers more particularly to a self-contained electric blower adapted to be mounted in an upright wall of a room and having means for conducting air, odors, etc., from such room to a suitable outlet.

One of the essential objects of the invention is to provide a blower structure of this type wherein a substantially horizontal electric motor is provided at opposite ends thereof with axially extending shaft portions and is provided intermediate its ends with a transversely extending vertical mounting plate. Thus, a single mounting will suffice for the motor and the two drive shaft portions.

Another object is to provide a blower structure wherein two fans have hubs fixed respectively to the shaft portions upon opposite sides of the mounting plate and have bowl-shaped portions opening toward and cooperating with the mounting plate to form an enclosure for the motor. Thus, the two fans are driven by a single motor and cooperate therewith to provide a compact assembly.

Another object is to provide a blower structure wherein the fans mentioned are provided at the inner edges of the bowl-shaped portions in substantially parallel relation to the mounting plate with vertical annular flanges that are provided upon opposite sides thereof with circumferentially spaced laterally projecting main and auxiliary blades or vanes for producing currents of air.

Another object is to provide a blower structure wherein the main vanes are upon the outer sides of the vertical flanges and are relatively long so as to extend over the bowl-shaped portions to points substantially in vertical alignment and concentric with the hubs of the fans. Thus, the weight of the main vanes is distributed over the bowl-shaped portions.

Another object is to provide a blower wherein opposite sides of the main vanes are throughout their length curved vertically inwardly from their upper to their lower edges so that the proper circulation of air will be effected.

Another object is to provide a blower structure wherein the auxiliary vanes are upon the inner sides of the vertical flanges and are relatively short and thin for creating a forced circulation of air about the motor for cooling purposes.

Another object is to provide a blower structure wherein the two fans have a common housing provided in opposite ends thereof at the outer free ends of the main vanes with air inlet openings and provided beyond the free end of the motor mounting plate with a single air outlet.

Another object is to provide a blower wherein the motor mounting plate is anchored within the fan housing at approximately the longitudinal median line thereof so as to serve as a partition within the housing between the air inlet openings in opposite end walls thereof.

Another object is to provide a blower structure wherein opposite sides of the blades or vanes of the fan are formed similarly so that either side of such blades will produce the desired currents of air with equal efficiency when the fan is rotating in either a clockwise or a counter-clockwise direction.

Another object is to provide a blower structure that is simple in construction, inexpensive to manufacture, and efficient in operation.

Other objects, advantages and novel details of construction of this invention will be made more apparent as this description proceeds, especially when considered in connection with the accompanying drawings, wherein:

Figure 1 is a perspective view of a blower structure embodying our invention;

Figure 2 is a fragmentary horizontal sectional view through an upright wall and showing the installation therein of the blower structure illustrated in Figure 1;

Figure 3 is a sectional view taken substantially on the line 3—3 of Figure 4;

Figure 4 is a sectional view taken substantially on the line 4—4 of Figure 3;

Figure 5 is a sectional view taken substantially on the line 5—5 of Figure 3;

Figure 6 is a sectional view taken substantially on the line 6—6 of Figure 5;

Figure 7 is a side elevation, with parts broken away and in section, of the blower structure illustrated in Figure 1;

Figure 8:
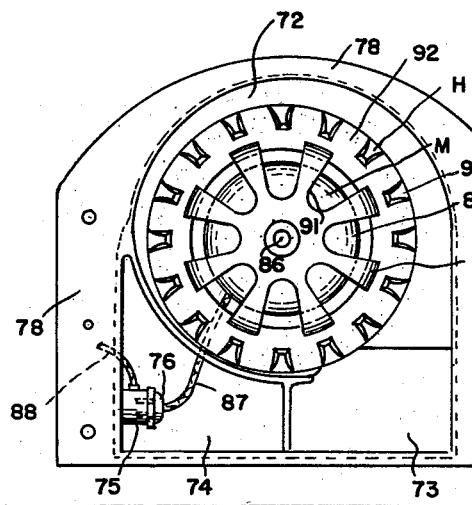
Figure 8 is a front elevation of the body portion, electric motor, fan and associated parts of a slight modification.

Referring now to the drawings, A is the housing, B is the electric motor, and C and D, respectively, are the fans of a blower structure embodying our invention.

As shown, the housing A has a circular portion 10, a tangentially extending elongated portion 11, an upright supporting plate 12, and curved deflectors 13 and 14. Preferably the circular portion 10 is provided in opposite upright end walls thereof with axially aligned circular inlet openings 15 and 16 for air and is divided vertically for the reception of the upright plate 12 between the two halves 17 and 18 thereof. Actually the outer half 17 is provided at the upper and lower edges thereof with vertical flanges 19 that are secured to the outer side of the plate 12, while the inner half 18 is provided at its upper and lower edges with vertical flanges 20 that are secured to the inner side of the plate 12. The tangentially extending elongated portion 11 is integral with the inner half 18 of the circular portion and both said inner half 18 and elongated portion 11 are divided vertically along substantially the longitudinal median line of the elongated portion. In this connection it will be noted that the sections 21 and 22 of the elongated portion 11 are held together at the top thereof by means of fasteners 23 engaging upstanding flanges 24 and 25, respectively, of said sections at the inner end thereof and by means of one or more fasteners 26 engaging flanges 27 and 28 over a downturned outer free end 29 thereof. At the bottom of the elongated portion 11 is a fastener 30 engaging depending flanges 31 of said sections.

The upright plate 12 is provided at the center thereof with an air opening 32 registering with the circular portion 10 and is provided at opposite ends of said circular portion with longitudinally spaced vertically extending elongated openings 33 for air. Such plate 12 is also provided at opposite ends thereof with other openings 34 for receiving suitable securing elements such as screws 35 for fastening the plate to an upright wall such as E. If desired, the portions 36 of the circular openings 15 and 16 that are exposed in front of the plate 12 may be provided with upright grille bars 37 to conform as near as possible to the grille-like appearance provided by the spaced elongated openings 33 in the plate.

The curved deflectors 13 and 14 are located at opposite ends of the circular portion 10 in rear of the elongated openings 33 in the vertical plate 12 and have vertical flanges 38 at the top and bottom edges thereof secured to the back of the plate 12. Preferably these deflectors 13 and 14 have inturned flanges 39 that have surface-to-surface engagement with and may be rigidly secured to opposite end walls of the circular portion 10.

Thus, with this construction air will flow through the elongated openings 33 in the plate 12 into the deflectors 13 and 14, thence through the axially aligned openings 15 and 16 into the circular portion 10 from which it will be forced, as hereinafter described, by the fans C and D outwardly through the elongated portion 11 to a suitable discharge point. Ordinarily the plate 12 would be fastened, as described, to the inner side of an upright outer wall of a room so that the elongated portion 11 of the housing may extend through said wall to the outside thereof. Hence, the air entering the elongated openings 33 in the plate 12 would be the air inside the room in which the blower was installed and would be discharged through the wall of the room to the outside. In this connection it will be apparent that some of the air inside the room will pass between the grille bars 37 directly into the circular portion 10 of the housing where it will be commingled with the air drawn into the housing from the elongated openings 33 before being discharged outwardly through the elongated portion 11.

The electric motor B is reversible and extends horizontally between the axially aligned openings 15 and 16 in the circular portion of the housing. Preferably the motor has a substantially cylindrical housing 40 and axially aligned shaft portions 41 and 42 at opposite ends of said housing. For mounting the motor B, we have provided a vertical plate 43 having an opening 44 receiving the motor B. Preferably this plate is rigidly secured by brackets 45 to the motor housing substantially midway its ends and is disposed substantially midway between opposite end walls of the circular portion 10 so as to constitute a partition between the openings 15 and 16. Such plate 43 conforms in curvature to the circular portion 10 so as to rest upon or against the curved lower and outer walls thereof and has a short extension 46 projecting into the inner end of the elongated portion 11 and having an upstanding flange or web portion 47 that is received between and secured to the upstanding flanges 24 and 25, respectively, of said elongated portion. In the present instance, the motor B has an electric conductor 48 in circuit with the usual wiring system of the building of which the room mentioned is a part. Likewise, any suitable means such as a conventional electric switch (not shown) may be employed in the circuit for controlling the operation of the motor.

The fans C and D have hubs 49 and 50 sleeved upon and fixed to the shaft portions 41 and 42 in spaced relation to the mounting plate 43 and have bowl-shaped portions 51 and 52 opening toward and cooperating with the mounting plate 43 to form an enclosure for the motor B. Preferably these bowl-shaped portions 51 and 52 have elongated slots 53 therein for air and are provided at their inner ends in spaced relation to the mounting plate 43 with vertical annular flanges 54 and 55. Upon the outer sides of these flanges are relatively long laterally projecting circumferentially spaced blades or vanes 56 that constitute the main means for producing currents of air, while upon the inner sides of said flanges are relatively short laterally projecting circumferentially spaced blades or vanes 57 constituting auxiliary means for producing currents of air. Preferably the main blades 56 extend over the bowl-shaped portions 51 and 52 to points substantially in vertical alignment and concentric with the hubs 49 and 50, respectively, of the fans. Thus, the main blades 56 extend toward but terminate short of the air openings 15 and 16 in opposite ends of the circular portion 10 of the housing, and the weight of such blades is distributed over the bowl-shaped portions 51 and 52 instead of beyond one end thereof. Opposite sides 58 and 59 of the main blades 56 are throughout their length curved vertically inwardly from their upper to their lower edges as illustrated in Figure 6 so that the proper circulation of air will be obtained with equal efficiency when the fan is rotating in either a clockwise or a counter-clockwise direction. The auxiliary blades 57 are substantially flat and thin so as to create a forced circulation of air about the motor B for cooling purposes. In this connection it will be noted that the action of the main blades 56 will also cause air to flow through the slots 53 in the bowl-shaped portions 51 and 52 for motor cooling purposes.

When the motor B is operating, the fans C and D will rotate and will cause air to be drawn from the room in which the blower structure is installed through the openings 15 and 16 into the circular portion 10 of the housing where it will be forced by the blades of the fans through the elongated portion 11 of the housing to the outside. In this connection it will be apparent that most of the air will pass through the elongated openings 33 in the plate 12 through the deflectors 13 and 14 to the openings 15 and 16, while some of the air will pass between the grille bars 37 through said openings 15 and 16 into the circular portion 10 of the housing. Preferably a gravity actuated damper 60 is provided in the elongated portion 11 of the housing adjacent the free end of the motor mounting plate 43 for normally closing said elongated portion when the motor B is idle. However, when the fans C and D are operated by the motor B, the force of air produced by the fans will be sufficient to swing the damper 60 from its full line closed position to the dotted line open position, Figure 7, and to hold it in such open position until the motor is stopped at which time the damper will fall by gravity to closed position.

Figure 9:
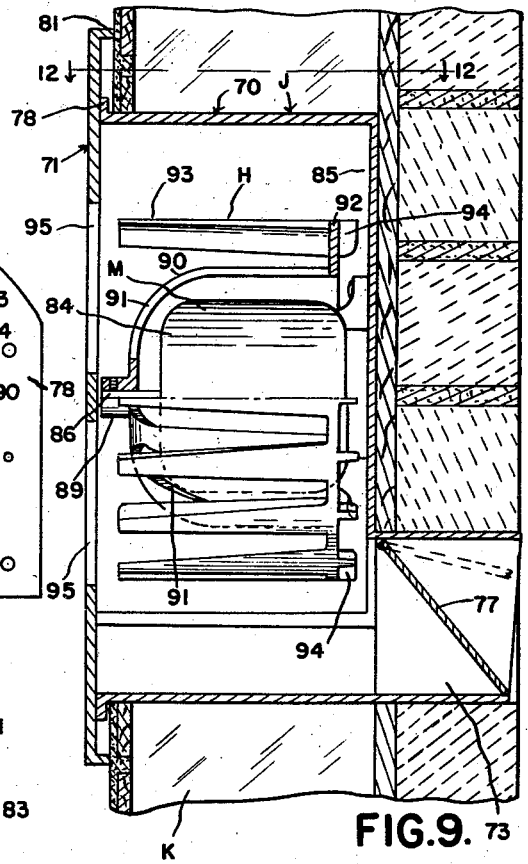
Figure 9 is a fragmentary vertical sectional view through an upright wall and showing the installation therein of the modification illustrated in Figure 8, and also showing the cover plate for the body portion of the housing in its operative position.
Figure 10:
Figure 10 is a front elevation of the cover plate.
Figure 11:
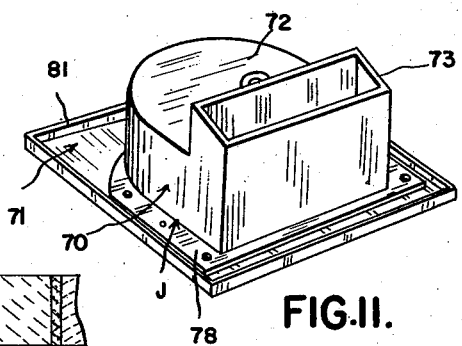
Figure 11 is a perspective view of the housing illustrated in Figure 9.
Figure 12:
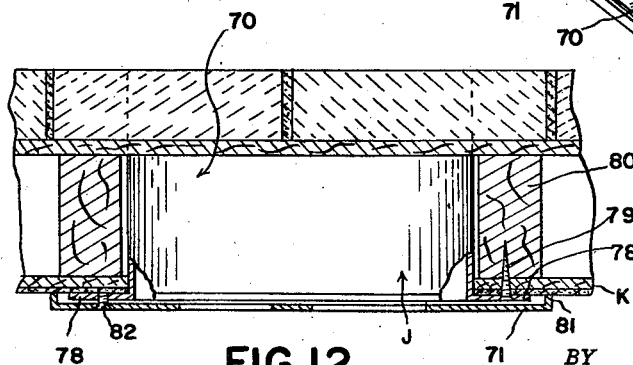
Figure 12 is a sectional view taken substantially on the line 12—12 of Figure 9.

In Figures 8 to 12, inclusive, we have illustrated a slight modification wherein a single fan H of the type illustrated in Figures 1 to 7, inclusive, herein is employed in a housing J generally similar to that illustrated in our application filed June 12, 1941, Serial No. 397,778. As shown, the housing J is mounted in an upright wall K of a room and has a hollow cup-shaped body portion 70 and a substantially flat cover plate 71. The body portion 70 has a substantially circular chamber 72 provided with a laterally projecting air outlet passage 73 and has a substantially triangular-shaped chamber 74 at one side of the outlet passage 73 constituting a handy terminal box for electrical parts such as a socket 75 and a plug 76. Such outlet passage 73 may extend through the wall K to the outside thereof and is provided with a gravity controlled damper 77. At the outer edges of the body portion 70 are laterally extending flanges 78 through which suitable screws 79 may extend for fastening the body portion 70 to a structural part 80 of the wall K. The cover plate 71 has a greater area than the body portion 70 so as to overlap and extend beyond the flanges 78 and has a marginal flange 81 for abutting engagement with the inner surface of the wall K. Preferably this cover plate 71 is detachably held in place by means of screws 82 that extend through openings 83 in said plate and threadedly engage the flanges 78 of the body portion 70.

An electric motor M has a substantially cylindrical housing 84 mounted on the upright wall 85 of the housing and has a drive shaft 86. In the present instance the motor M has an electric conductor 87 connected to the plug 76, and an electric conductor 88 in circuit with the usual wiring system of the building of which the room mentioned is a part is connected to the socket 75. Any suitable electric switch (not shown) may be used in the circuit for controlling the operation of the motor.

The fan H has a hub 89 sleeved on and secured to the drive shaft 86 of the motor and has a bowl-shaped portion 90 forming an enclosure for the motor M and opening toward the upright wall 85 of the housing. Preferably this bowl-shaped portion 90 has elongated slots 91 therein for air and is provided at its inner open end in spaced substantially parallel relation to the upright wall 85 of the housing with a vertical annular flange 92. Upon the outer side of this flange 92 are relatively long laterally projecting circumferentially spaced blades or vanes 93 that constitute the main means for producing currents of air, while upon the inner side of said flange 92 are relatively short laterally projecting circumferentially spaced blades or vanes 94 constituting auxiliary means for producing currents of air. As shown, the main blades 93 extend outwardly over the bowl-shaped portion 90 to points substantially in vertical alignment and concentric with the hub 89 of the fan.

Located in the cover plate 71 in registration with the circle defined by the main blades 93 is a circular series of openings 95 forming air inlets for the housing. By referring to Figure 9, it will be noted that the inside diameter of the circle of openings is substantially equal to the diameter of the hub 89 of the fan, while the outside diameter of said circle of openings is substantially equal to the diameter of the circle defined by the blades 93. Moreover, it will be noted that the slots 91 in the bowl-shaped portion 90 of the fan are in horizontal alignment with the circle of openings 95. Thus, when the motor M is operating, air will be drawn in through the openings 95 into the body portion 70 of the housing where it then will be forced by the blades of the fan outwardly through the outlet 73. Some of the air drawn into the body portion 70 will enter the slots 91 and the short blades 94 will create a suction between the flange 92 and upright wall 85 of the housing so that a circulation of air about the motor for cooling purposes will be assured. When passing out through the outlet passage 73, the air will have sufficient force to lift the damper 77 from the full line closed position thereof to the dotted line open position illustrated in Figure 9 and will hold it in such open position until the motor M is stopped. The damper will then fall by gravity to closed position.

What we claim as our invention is:

1. A blower structure having a housing, an electric motor, and two fans, the housing having a circular portion, a tangentially extending elongated outlet portion, and an upright supporting plate, the circular portion having axially aligned inlet openings for air and having two sections, the upright plate being between and rigid with said sections, an upright plate within and rigid with the circular and elongated portions of the housing and having an opening in alignment with the air inlet openings receiving the motor, said motor being secured to the last mentioned plate and having shaft portions in alignment with the inlet openings, and the fans being mounted on the shaft portions and having blades or vanes extending toward the inlet openings.

2. A blower structure having a housing, an electric motor, and two fans, the housing having a circular portion, a tangentially extending elongated outlet portion and an upright supporting plate, the circular portion having axially aligned inlet openings for air and having two sections, the upright plate being between and rigid with said sections, said plate having an opening registering with the circular portion and provided upon opposite sides of said circular portion with openings for air, deflectors for air on the back of said plate for directing air from the last mentioned openings to the inlet openings aforesaid, the motor being mounted in the circular portion and having shaft portions at opposite ends thereof, and the fans being fixed to said shaft portions.

3. A blower structure comprising an electric motor having drive shaft portions at opposite ends thereof, and fans having hubs mounted on said shaft portions and having oppositely disposed cup-shaped portions opening toward and cooperating with each other to form a housing or enclosure for the motor, said cup-shaped portions being provided at their inner free edges with outwardly projecting annular flanges disposed in substantially parallel relation to each other and provided between said hubs and flanges with openings through which air may flow to cool the motor, and oppositely extending blades projecting laterally from opposite sides of said annular flanges at spaced points circumferentially thereof and disposed in circles substantially concentric with the shaft portions of the motor, the blades on the outer sides of said flanges being relatively long and overlying the cup-shaped portions throughout substantially the length thereof, the blades on the inner sides of said flanges being relatively short and operable to draw air through the openings in said cup-shaped portions to cool the motor.

4. A blower structure comprising an electric motor having drive shaft portions at opposite ends thereof, and fans having hubs mounted on said shaft portions and having oppositely disposed cup-shaped portions opening toward and cooperating with each other to form a housing or enclosure for the motor, the inner edges of said cup-shaped portions being spaced apart near the center of the motor and having outwardly projecting annular flanges disposed in substantially parallel relation to each other, and oppositely extending blades projecting laterally from opposite sides of said annular flanges at spaced points circumferentially thereof and disposed in a circle substantially concentric with the shaft portions of the motor, the blades on the outer sides of said flanges overlying and spaced from the cup-shaped portions, the blades on the inner sides of said flanges overlying and spaced from the motor.

5. A blower structure comprising an electric motor having a drive shaft at one end thereof, and a fan having a hub mounted on said shaft and having a cup-shaped portion enveloping the motor and provided at the open end thereof with an outwardly projecting annular flange, said cup-shaped portion being provided between the hub and annular flange with openings through which air may flow to cool the motor, and oppositely extending blades projecting laterally from opposite sides of said annular flange at spaced points circumferentially thereof and disposed in a circle substantially concentric with the axis of the motor, the blades upon one side of said flange overlying and spaced from the cup-shaped portion and being substantially equal in length to the length of said cup-shaped portion, the blades on the other side of said flange being relatively short and operable to draw air through the openings in said cup-shaped portion to cool the motor.

6. A blower structure comprising an electric motor having a drive shaft at one end thereof, and a fan having a hub mounted on said shaft and having a cup-shaped portion enveloping the motor and provided at the open end thereof with an outwardly projecting annular flange, and oppositely extending blades projecting laterally from opposite sides of said annular flange at spaced points circumferentially thereof and disposed in a circle substantially concentric with the axis of the motor, the blades upon one side of said flange overlying and spaced from the cup-shaped portion and being relatively long, the blades on the other side of said flange being relatively short and operable to create a circulation of air to cool the motor.

7. A blower structure comprising an electric motor having drive shaft portions at opposite ends thereof, and fans having hubs mounted on said shaft portions and having oppositely disposed cup-shaped portions opening toward and cooperating with each other to form a housing or enclosure for the motor, said cup-shaped portions having outwardly projecting annular flanges at their inner edges and oppositely extending blades projecting laterally from opposite sides of said annular flanges, the blades on the outer sides of said flanges overlying and spaced from the cup-shaped portions, the blades on the inner sides of said flanges being spaced from each other and overlying the motor, a mounting plate for the motor in the space between the inner blades, and a common housing for said fans, motor, and mounting plate provided at the outer free ends of the outer blades with air inlet openings and provided in rear of the motor mounting plate with a single air outlet.

8. A blower structure comprising an electric motor having drive shaft portions at opposite ends thereof, and fans having hubs mounted on said shaft portions and having oppositely disposed cup-shaped portions opening toward and cooperating with each other to form a housing or enclosure for the motor, said cup-shaped portions having outwardly projecting annular flanges at their inner edges and oppositely extending blades projecting laterally from opposite sides of said annular flanges, the blades on the outer sides of said flanges overlying and spaced from the cup-shaped portions, the blades on the inner sides of said flanges being spaced from each other and overlying the motor, a mounting plate for the motor in the space between the inner blades, and a common elongated housing for said fans provided in opposite sides thereof adjacent the outer free ends of the outer blades with air inlet openings and provided in rear of the motor mounting plate with a single air outlet, said motor mounting plate being within said housing at approximately the longitudinal median line thereof and serving as a partition between the air inlet openings aforesaid.

9. A blower structure comprising an electric motor having drive shaft portions at opposite ends thereof, and fans having hubs mounted on said shaft portions and having oppositely disposed cup-shaped portions opening toward and co-operating with each other to form a housing or enclosure for the motor, said cup-shaped portions having outwardly projecting annular flanges at their inner edges and oppositely extending blades projecting laterally from opposite sides of said annular flanges, the blades on the outer sides of said flanges overlying and spaced from the cup-shaped portions, the blades on the inner sides of said flanges being spaced from each other and overlying and spaced from the motor, a common housing for said fans and motor provided at the outer free ends of the outer blades with air inlet openings and provided elsewhere with an air outlet opening, and a mounting for the motor carried by the housing in the space between the blades on the inner sides of said flanges.

ROBERT E. COTTON.
MARIO C. TATA.